United States Patent Office 3,801,682
Patented Apr. 2, 1974

3,801,682
PROCESS FOR PRODUCING DIALKENYL
DIALKYL PHOSPHONATES
Ralph S. Ludington, Holley, N.Y., assignor to Borg-Warner Corporation, Chicago, Ill.
No Drawing. Continuation-in-part of abandoned application Ser. No. 738,850, June 21, 1968, which is a continuation-in-part of application Ser. No. 443,656, Mar. 29, 1965, now Patent No. 3,400,102. This application Apr. 30, 1971, Ser. No. 139,252
Int. Cl. C07f 9/40; C08f 45/58
U.S. Cl. 260—969
4 Claims

ABSTRACT OF THE DISCLOSURE

Phosphonates are produced by reacting an unsaturated carboxylic ester and a monocarboxylic acid with a phosphorus compound of the formula $(RO)_xP(R')_y$ wherein R and R' contain from 1 to 12 carbon atoms and are independently selected from the group consisting of alkyl, alkylene, alkenyl, aralkyl and aryl, and halogenated derivatives thereof, provided that at least one R is alkyl, alkenyl, aralkyl or alkylene; $x$ is from 1 to 3, $y$ is from 0 to 2 and the sum of $x$ and $y$ is 3. Compounds that can be produced include dialkenyl dialkyl phosphonates such as diallyl dimethyl phosphonosuccinate. The compounds are useful in preparing fire retardant polymer compositions, bituminous compositions and coating compositions.

REFERENCE TO PRIOR APPLICATION

This is a continuation-in-part of copending application Ser. No. 738,850, filed June 21, 1968 now abandoned, which is a continuation-in-part of copending application Ser. No. 443,656, filed Mar. 29, 1965, now U.S. Pat. 3,400,102.

BACKGROUND OF THE INVENTION

This invention relates to novel esters and a process for their manufacture. In such a process, phosphite esters are reacted with the esters of alpha-beta unsaturated acids.

It has been observed (G. Kamai and V. A. Kukhtin, Zhurnal Obshchei Khimii, volume 31, No. 5, pp. 1735–1736, 1961) that no appreciable reaction occurs between triethyl phosphite and methyl acrylate at temperatures up to 120 degrees centigrade. Thus, it would appear that dimethyl maleate and trimethyl phosphite would not be expected to yield tetramethyl phosphonosuccinate under the same conditions. When it was attempted to react equivalent proportions of dimethyl maleate and trimethyl phosphite by the slow addition of phosphite at about 80 degrees centigrade under nitrogen, no tetramethyl phosphonosuccinate could be isolated from the reaction mixture. Instead, a quantitative yield of dimethyl fumarate was recovered from the reaction mixture by simple filtration.

SUMMARY OF THE INVENTION

In accordance with this invention, there is provided a process for preparing phosphonates by reacting a saturated carboxylic acid and an ethylenically unsaturated carboxylic ester with a phosphite at an elevated temperature. Thereafter, the resulting phosphonate of the formula

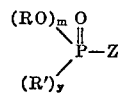

is recovered wherein Z is an aliphatic carboxylic ester radical of an α,β-ethylenically unsaturated carboxylic acid containing 3-9 carbon atoms and 1-2 carboxyl groups and an aliphatic hydroxyl-containing compound having 1-8 carbon atoms and 1-3 hydroxyl groups, said radical attached to the phosphorus atom at a carbon atom adjacent to, i.e., attached to, a carboxylic ester group; $m=0$ to 2, $y=0$ to 2, and $m+y=2$; and each R and R' is independently selected from the group consisting of alkyl, alkylene, alkenyl, aralkyl, aryl and halogenated derivatives thereof, containing 1–12 carbon atoms. Novel phosphonate compounds such as dialkenyl dialkyl phosphonates, e.g., diallyl dimethyl phosphonosuccinate are thereby produced.

DESCRIPTION OF THE EMBODIMENTS

In practicing this invention, it is desirable that the saturated carboxylic acid contain from one to about 18 carbon atoms and preferably from one to eight carbon atoms. Suitable saturated, i.e., free of ethylenic and acetylenic unsaturation, acids preferably contain 1 to about 8 carbon atoms and are exemplified by formic acid, acetic acid, propionic acid, benzoic acid, phenylacetic acid, toluic acid and isobutyric acid. The saturated acid is employed in at least a stoichiometric amount, 1 to 4 moles being suitable and preferably 1.1 to 3 moles of saturated carboxylic acid being employed for each mole of an unsaturated carboxylic ester.

The ethylenically unsaturated carboxylic ester is the esterification product of a hydroxyl-containing compound and an α,β-ethylenically unsaturated acid having 3 to 9 carbon atoms and 1 to 2 carboxyl groups such as acrylic acid, crotonic acid, isocrotonic acid, methacrylic acid, sorbic acid, maleic acid, fumaric acid, cinnamic acid or the anhydrides of the above dicarboxylic acids. The hydroxyl-containing compound is preferably aliphatic or cycloaliphatic, generally contains from 1 to 20 carbon atoms and 1 to 3 hydroxyl groups, and preferably contains 1 to 8 carbon atoms and one hydroxyl group. Suitable hydroxyl containing compounds, e.g., alcohols, include methyl alcohol, ethyl alcohol, butyl alcohol, amyl alcohol, decyl alcohol, dodecyl alcohol, octadecyl alcohol, ethylene glycol, butylene glycol, hexanediol, octanediol, glycerol, butanetriol, hexanetriol, trimethylol ethane, trimethylol propane, trimethylolhexane, trimethylolnonane, trimethylolbutene and the like.

The phosphorous compounds employed in the process of this invention are esters of trivalent phosphorus, referred to in the literature as phosphites, phosphonites and phosphinites, which for simplicity will be collectively referred to as phosphites and are of the structure $$(RO)_xP(R')_y$$

in which R and R' groups contain from one to twelve carbon atoms, the phosphite containing a total of 3 to 36 carbon atoms, and each R and R' is independently selected from the group consisting of alkyl, alkylene, alkenyl, aralkyl and aryl, provided that at least one R is alkyl, alkylene, alkenyl or aralkyl, $x$ is a number from 1 to 3 and $y$ is a number from 0 to 2 and the sum of $x$ and $y$ is three. The foregoing substituents of R and R' may be halogenated; the chlorinated and brominated derivatives being preferred. Typical phosphites which are satisfactory in the process of this invention include trimethyl phosphite, triethyl phosphite, trioctyl phosphite, triallyl phosphite, tribenzyl phosphite, dibenzyl methyl phosphite, diphenyl methyl phosphite, tris-chlorobenzyl phosphite, tris bromobenzyl phosphite, triisopropenyl phosphite, phenyl ethylene phosphite, tris - β - chloroethyl phosphite, dibutyl methylphosphonite, diethyl vinylphosphonite, diethyl phenylphosphonite and ethyl dimethylphosphinite.

The process of this invention may be carried out over a wide variation of temperatures, however, it is desirable that the reaction be conducted at a temperature from about 20 degrees centigrade to about 110 degrees centigrade, and preferably from about 60 degrees centigrade to 100 degrees centigrade. The time and rate of reaction is guided by temperature considerations. Since the reaction is exothermic, the phosphite should be added to the reaction mixture at such a time and rate that the temperature is maintained within the aforementioned desirable limits. In the typical operation of the process of this invention to reaction is completed in a period of from about two to ten hours. Among the esters of saturated acids which may be formed and distilled off during this process are methyl formate, ethyl formate, methyl acetate, isopropyl formate, ethyl acetate, methyl propionate, n-propyl formate, allyl formate, isopropyl acetate, methyl isobutyrate, sec-butyl formate, isobutyl formate, ethyl propionate, n-propyl acetate, methyl n-butyrate, allyl acetate, n-butyl formate, ethyl isobutyrate and beta-chloroethyl acetate.

Among the novel products produced by the process of this invention are the dialkenyl dialkyl phosphonates, which is a generic term used to describe the compounds such as diallyl dimethyl phosphonosuccinate produced in Example 3 below. The structural formula for this compound is as follows:

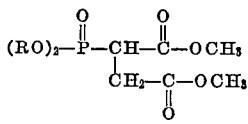

where R is an allyl group. The alkyl and alkenyl groups of the phosphonates of the invention generally are those radicals resulting from the reaction of the phosphorus compounds disclosed herinbefore with carboxylic esters of the hydroxyl-containing compounds disclosed hereinbefore, e.g., the reaction of triallyl phosphite with dimethyl maleate by the process of the invention produces diallyl dimethyl phosphonosuccinate. More particularly, the alkyl radicals have 1 to 8 carbon atoms, such as methyl, ethyl, butyl, hexyl and octyl, and the alkenyl radicals have 2 to 8 carbon atoms, such as vinyl, allyl, crotonyl, isopropenyl, hexenyl, octenyl, and the like. Compounds of the invention include diallyl dimethyl phosphonosuccinate, divinyl dimethyl phosphonosuccinate, diisopropenyl dimethyl phosphonosuccinate and dihexenyl dimethyl phosphonosuccinate. In naming the phosphonates of the invention, the groups attached to phosphorus through oxygen are named first and the groups forming the ester groups of the carboxylic ester attached directly to the phosphorus are named second as indicated in naming the compound having the above structural formula.

The invention is illustrated by the following examples but is not intended to be limited thereby. In this specification and claims, parts are given by weight and temperatures are in degrees centigrade, unless otherwise indicated.

EXAMPLE 1

To a three-necked flask equipped with stirrer, dropping funnel and reflux condenser were charged 172 parts of methyl acrylate and 120 parts of acetic acid. The mixture was heated to 70 degrees centigrade and 248 parts of trimethyl phosphite were added dropwise over a 15-minute period. This mixture was heated with stirring at 75 to 80 degrees centigrade for an additional 1½ hours and was then transferred to a distillation flask and separated by distillation into two principal fractions (1) 6.5 parts of material boiling at 55 to 60 degrees centigrade under atmospheric pressure and (2) 26.8 parts of material boiling at 90 to 98 degrees centigrade and 0.35 millimeter of mercury pressure. This second fraction had a refractive index $n_D^{20}$ of 1.4373. The literature shows the refractive index of trimethyl phosphonopropionate to be 1.4370, verifying that this is the product made.

EXAMPLE 2

Using the procedure of Example 1, 144 parts of dimethyl maleate and 66 parts of glacial acetic acid were charged to a reaction vessel. The mixture was heated, with stirring, to about 55 degrees centigrade and then 124 parts of trimethyl phosphite were added drop-wise at a rate to keep the reaction temperature below 80 degrees centigrade. During the addition, a liquid started to distill from the reaction mixture. After the addition was completed, external heating was supplied until the distillation of low boiling materials ceased. A total yield of 51.6 parts of such materials was obtained. The reaction mixture was then fractionally distilled under reduced pressure after removal of the low boiling fraction. The main portion (203.5 parts) had a boiling point of 122 degrees centigrade at 0.25 millimeter of mercury pressure. This fraction was identified as tetramethyl phosphonosuccinate by comparison of its infrared spectrum with that of an authentic sample prepared by a prior art method.

*Analysis.*—Calculated for $C_8H_{15}O_7P$: Theory: P=12.19 percent. Found: P=12.14 percent.

EXAMPLE 3

Using the process of Example 1, 14.4 parts of dimethyl maleate and 20.2 parts of triallyl phosphite and 6.0 parts of glacial acetic acid were reacted. Four and three-tenths parts of allyl acetate were obtained and the compound was identified by its boiling point of 98 to 100 degrees centigrade and refractive index of $n_D^{20}$ of 1.4048. A second portion consisting of 19.9 parts of material having a boiling point of 144 to 148 degres centigrade at a vapor pressure of 0.18 millimeter of mercury was obtained. The infrared spectrum and phosphorus analysis of the product confirmed that it was diallyl dimethyl phosphonosuccinate. The infrared spectrum showed the following absorption peaks: 3.41, 5.75, 6.09, 6.96, 7.5, 7.94, 8.22, 8.61, 9.19, 9.3–10.1 and 11.63 microns. The recovery of 19.9 parts of diallyl dimethyl phosphonosuccinate represented a yield of 65 percent of the theoretical. The product is useful with or without styrene in preparing crosslinked castings and laminates.

*Analysis.*—Calculated for $C_{12}H_{19}O_7P$: Theory: P=10.11 percent. Found: P=9.94 percent.

EXAMPLE 4

A mixture of 100 parts of methyl methacrylate and 66 parts of acetic acid was charged to a 3-necked round bottom flask equipped with magnetic stirrer, distillation head, thermometer and dropping funnel. Then, 198 parts of diethyl phenylphosphonite were added drop-wise, with stirring. During the addition, the temperature increased to 40 degrees centigrade, after which heat was supplied to raise it to 80 degrees centigrade. The heating was continued for 4 hours after the phosphonite addition was complete. Distillation of the reaction product yielded 100 parts of a volatile portion which was mainly ethyl acetate, and 189 parts of a material boiling at 135 to 138 degrees centigrade at 38 millimeters of mercury pressure. The product had a refractive index of $n_D^{25}$ of 1.5040. The infrared spectrum of this fraction is consistent with that of ethyl phenyl-2-carbomethoxy propyl phosphinate.

*Analysis.*—Calculated for $C_{13}H_9O_4P$: Theory: P=11.46 percent. Found: P=11.5 percent.

The compounds produced in accordance with the invention are useful as fire retardant additives in polymer compositions, coating compositions and bituminous compositions. The phosphonates containing unsaturated radicals are further useful in the preparation of polymerized and crosslinked polymer compositions. The unsaturated phosphorus compound can be homopolymerized or can be copolymerized with vinyl monomers such as styrene in the presence of a free radical catalyst, such as cumene hydroperoxide.

The foregoing phosphorus-containing polymers can be used in preparing plastic articles, reinforced plastic articles, castings, laminates and other filled or reinforced polymer compositions, which exhibit good fire retardance.

Although certain preferred embodiments of the invention have been disclosed for the purpose of illustration, it will be evident that various changes and modifications may be made therein without departing from the scope and spirit of this invention.

What is claimed is:

1. A process for preparing phosphorus compounds by reacting at a temperature of from about 20° to about 110° C. (A) acetic acid and (B) an ethylenically unsaturated carboxylic ester of a saturated aliphatic alcohol having 1 to 20 carbon atoms and an alpha-beta-ethylenically unsaturated acid or anhydride having 3 to 9 carbon atoms and 1 to 2 carboxyl groups, with (C) a phosphorus compound of the formula $(RO)_xP(R')_y$ wherein R and R' contain from 1 to 12 carbon atoms and are independently selected from the group consisting of alkyl, alkylene, alkenyl, and aryl and the chlorinated and brominated derivatives thereof, provided that at least one R is alkyl, alkenyl, or alkylene, $x$ is from 1 to 3, $y$ is from 0 to 2 and the sum of $x$ and $y$ is 3.

2. The process of claim 1 wherein the ratio of carboxylic ester to acetic acid is from 1:1.1 to about 1:3.

3. The process of claim 1 wherein the phosphorus compound produced is dialkenyl dialkyl phosphosuccinate.

4. The process of claim 1 wherein R is allyl and the saturated aliphatic alcohol is methyl alcohol.

References Cited

UNITED STATES PATENTS 2,754,320   7/1956   Johnston _____ 260—941
3,196,190   7/1965   Nischk et al. _____ 260—941 X ANTON H. SUTTO, Primary Examiner U.S. Cl. X.R.

260—2 P, 45.7 P, 941, 942